US011040903B2

(12) United States Patent
Breske et al.

(10) Patent No.: US 11,040,903 B2
(45) Date of Patent: Jun. 22, 2021

(54) PURIFICATION OF NACL BRINE CONTAINING IODINE

(71) Applicant: THE CHEMOURS COMPANY TT, LLC, Harrisburg, PA (US)

(72) Inventors: Stephen Thomas Breske, Wilmington, DE (US); Lisa Edith Helberg, Middletown, DE (US); Peter Hill, Woodstown, NJ (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 83 days.

(21) Appl. No.: 15/273,740

(22) Filed: Sep. 23, 2016

(65) Prior Publication Data

US 2017/0096346 A1    Apr. 6, 2017

Related U.S. Application Data

(60) Provisional application No. 62/237,210, filed on Oct. 5, 2015.

(51) Int. Cl.
| C02F 9/00 | (2006.01) |
| C01B 7/14 | (2006.01) |
| C01D 3/14 | (2006.01) |
| C02F 101/12 | (2006.01) |
| C02F 1/66 | (2006.01) |
| C02F 1/76 | (2006.01) |
| C02F 1/28 | (2006.01) |

(52) U.S. Cl.
CPC .......... C02F 9/00 (2013.01); C01B 7/14 (2013.01); C01D 3/145 (2013.01); C02F 1/285 (2013.01); C02F 1/66 (2013.01); C02F 1/76 (2013.01); C02F 2101/12 (2013.01); C02F 2209/04 (2013.01)

(58) Field of Classification Search
CPC combination set(s) only.
See application file for complete search history.

(56) References Cited

U.S. PATENT DOCUMENTS

| 3,352,641 A | 11/1967 | Nakamura et al. |
| 5,069,884 A * | 12/1991 | Filippone .................. C01D 3/14 210/754 |
| 6,238,544 B1 * | 5/2001 | Oohara ..................... C01D 3/14 205/536 |
| 2008/0152724 A1 * | 6/2008 | Hirsh .................... A61K 9/0063 424/618 |
| 2008/0289972 A1 * | 11/2008 | Pastacaldi ................. C01B 7/14 205/742 |
| 2009/0120878 A1 * | 5/2009 | Hilaly ..................... C07C 29/76 210/656 |
| 2012/0199493 A1 | 8/2012 | Krafft et al. |
| 2018/0119298 A1 * | 5/2018 | Mok ....................... C25B 15/08 |

FOREIGN PATENT DOCUMENTS

| EP | 0659686 B1 | 6/1998 |
| FR | 2411801 | 12/1977 |
| GB | 2230769 A | 10/1990 |

OTHER PUBLICATIONS

Application Data Sheet, Fundamentals of ORP Measurement, May 2008.

* cited by examiner

*Primary Examiner* — Chester T Barry

(57) ABSTRACT

The present invention provides a process for separating iodine from a NaCl brine, comprising the following steps: (a) providing said NaCl brine containing iodide, (b) adjusting the pH of said NaCl brine to be no greater than 1.5, (c) adding oxidizing agent, such as chlorine containing oxidizing agent, to said NaCl brine resulting from step (b) to obtain an oxidation-reduction potential in said NaCl brine of from 560 mV to 925 mV, the combination of said pH of no greater than 1.5 and oxidation-reduction potential of 560 mV to 925 mV resulting in the formation of an iodine-chlorine anionic complex, and (d) contacting nonionic adsorption resin and said NaCl brine from step (c) one with the other to adsorb said iodine from this brine, to obtain as a result thereof NaCl brine wherein the iodine content therein is preferably no greater than 100 ppbw, more preferably no greater than 10 ppbw.

14 Claims, No Drawings

PURIFICATION OF NACL BRINE CONTAINING IODINE

BACKGROUND INFORMATION

Field of the Disclosure

This invention relates to the separation of iodine from NaCl brine, thereby purifying the brine.

Description of the Related Art

EP 1 966 086 discloses the purification of aqueous NaCl solutions for use in the manufacture of sodium carbonate or sodium hydroxide by electrolysis [0023], i.e. chlor-alkali production. The aqueous NaCl solution prior to purification contains excessive amounts of iodine, calcium, and magnesium [0003]. Calcium and magnesium are removed from the solution in a first step of alkalizing to precipitate the calcium and magnesium and subsequent solid-liquid separation, followed by a second step of acidifying and oxidizing the iodide in the solution, and a third step of bringing the oxidized solution into contact with a basic halogenated anion exchange resin, the exchange resin being regenerated by elution using a portion of the solution from the first step [0007]. The advantage of this process is disclosed to reside in the regeneration not requiring the use of equipment and reagent that significantly increases cost [0005 and 0006].

In the explanation of the second step, after acidifying to a preferred pH from 1.5 to 2 [0016], '086 discloses control of introduction of oxidizing agent into the NaCl solution to produce a redox potential (ORP) in the solution that is greater than required to give molecular iodine [0012]. Redox potentials of 500 mV to 1000 mV, preferably 600 mV to 850 mV are disclosed, these redox potentials reducing the risk of forming iodate ions [0013]. The oxidation is disclosed to produce polyhalogenated complexes, of which $(I_2Cl)^-$ is disclosed [0014].

In the explanation of the third step, the anion exchange resin is disclosed to comprise fixed cationic sites and interchangeable anionic sites occupied by halogen anions such as $Br^-$, $Cl^-$, and $I^-$ [0014]. The adsorption of the polyhalogenated anionic complex by the resin is depicted by the following equation:

$$R^+X^-(I_2Cl)^- \rightarrow R^+(I_2Cl)^- + X^-$$

wherein R+ is the fixed cationic site and X− is the halide anion occupying the interchangeable anionic site [0014]. According to the above equation, the anionic complex replaces the halide anion on the cationic site, forming a strong complex with the anion exchange resin. It is thus apparent that the mechanism of the adsorption by the resin is attraction by the cationic site for the anionic complex containing the iodine.

This adsorption of the polyhalogenated complex is the complexation of the polyhalogenated anionic complex with the anion exchange resin.

There remains a need for improvement in the process of purifying aqueous NaCl salt solution by separation of iodine therefrom. Using strong base anion exchange resins has several difficulties. First, the density of the resin beads themselves is close to the density of the NaCl solutions. When the fluid density and resin density are closely matched, the resin bed has the opportunity to lift and separate, thereby, not remaining tightly packed as is required for optimal removal. This limitation can be avoided through a type of mechanical fixing of the bed or by keeping the flow rate of fluid through the bed constant and high enough to maintain the close packing of the bed. Mechanical fixed bed designs are available commercially but are more difficult to operate and maintain than standard beds with freeboard. High and constant flow rate can also be designed into a system through the use of additional controls to ensure high uptime of the unit. High flow rate can be a capacity limitation depending on the rate of mass transfer through a system. Neither of these limitations is desirable in a system where either the NaCl density changes considerably over time or consistent down-time is expected such as in an operation for treatment of a process NaCl stream such as can be produced as a by-product rather than from sea water or dissolution of rock salt as a direct process feed.

Another difficulty in the use of strong base anion exchange resins is the breakdown of the functional group. This limitation is true for all strong base anion exchange applications over time. Contributing to this breakdown is the strongly oxidizing conditions resulting from the high ORP concentrations such as disclosed in '086. It would also be found to be impacted during the regeneration cycle. The breakdown of the active sites is known to lead to loss of adsorption capacity over time and can also produce an unwanted odor from the release of volatile amines into the outlet fluid.

SUMMARY

The present invention provides improvement by the process for separating iodine from a NaCl brine, comprising the following steps:
(a) providing said NaCl brine containing iodide,
(b) adjusting the pH of said NaCl brine to be no greater than 1.5,
(c) adding oxidizing agent to said NaCl brine resulting from step (b) to obtain an oxidation-reduction potential in said NaCl brine of from 560 mV to 925 mV, the combination of said pH of no greater than 1.5 and oxidation-reduction potential (ORP) of 560 mV to 925 mV resulting in the formation of an iodine-chlorine anionic complex, and
(d) contacting non-ionic adsorption resin and said NaCl brine from step (c) one with the other to adsorb said iodine from this brine. The oxidation-reduction potentials cited herein with respect to the present invention are referenced to an Ag/AgCl electrode.

Since the resin is non-ionic, the mechanism of adsorption is not by ion exchange as in EP1 966 086. It is surprising that the adsorption occurs without ion exchange. It is even more surprising that the adsorption capacity of the non-ionic adsorption resin is much greater than that obtained by anion exchange resin. These surprising results occur under the pH and ORP conditions of step (c) of the process of the present invention. The greater adsorption capacity of the non-ionic resin enables the purification process to be conducted with fewer regeneration steps of the nonionic adsorption resin involving elution of the adsorbed iodine from the resin making it available for reuse. Thus the purification process can be conducted for a longer period of time before process interruption for regeneration of the adsorptive capacity of the nonionic adsorption resin.

The oxidizing agent of step (c) preferably is chlorine-containing. The iodine-chlorine complex of step (c) contains chlorine supplied by the oxidizing agent and/or by the NaCl in the brine.

The adsorption of the iodine by the non-ionic adsorption resin in effect separates the iodine from the NaCl brine, whereby the iodine content of the brine is greatly reduced. The result of the practice of step (d) is preferably that the iodine content therein is no greater than 100 ppbw, more preferably no greater than 10 ppbw, based on the weight of the brine. This adsorption/separation can include the iodine-chlorine complex. The contacting step (d) can be followed by the step of separating the non-ionic adsorption resin containing the adsorbed iodine-chlorine anionic complex from the NaCl brine one from the other, whereby the purified NaCl brine is useful in such processes as chlor-alkali using a Nafion© membrane. The separation of the non-ionic adsorption resin containing the adsorbed iodine-chlorine anionic complex from the NaCl brine physically separates the iodine from the brine.

The present invention achieves a high degree of purification of NaCl brine contaminated with iodide, arising from the surprising efficacy of the non-ionic adsorption resin, without sacrificing the NaCl for use in the elution step for regenerating the non-ionic adsorption resin.

Preferred embodiments of the process of the present invention, which can be used individually or in any combination, are as follows:

The NaCl brine of step (a) contains at least 4 wt % of NaCl.

The adjusting of step (a) is carried out by adding HCl to the NaCl brine.

The pH is no greater than 1.4, more preferably no greater than 1.3, even more preferably no greater than 1.2, and most preferably no greater than 1.1.

The oxidizing agent is alkali or alkaline earth metal hypochlorite.

The oxidizing of step (c) is carried out at a temperature of from 15 to 50° C.

The non-ionic adsorption resin is particulate such as in the form of beads.

DETAILED DESCRIPTION

With respect to step (a), the NaCl brine that is the starting material for the purification process of the present invention, has the following preferred or more preferred characteristics:

The NaCl brine of step (a) contains 17 to 25 wt % of NaCl. The wt % of ingredients in the brine disclosed herein is based on the total weight of the brine.

The iodide content of the brine is no greater than 10 ppmw. The brine will contain at least 1.0 ppmw, more preferably at least 0.5 ppmw. The ppmw of iodide is based on the weight of the brine.

The brine can contain alkali and alkaline earth metals other than Na. Separate removal of these elements (metals) is unnecessary in the practice of the present invention.

The pH of the starting NaCl brine is greater than 6 and is generally around 8, which is characteristic of iodide-containing NaCl brines available for purification and then further industrial use.

The brine is preferably also essentially free of organic material. Preferably the brine contains no more than 20 ppmw of organic material, more preferably no more than 5 ppmw, based on the weight of the brine.

With respect to step (b), the pH adjustment is carried out by adding acid to the NaCl brine to reach the pH desired of 1.5 or lower as described above, most preferably no greater than 1.0. HCl is the preferred acid because other common inorganic acids present problems in subsequent use of the purified brine such as in chlor-alkali production. For other use of the purified brine, sulfuric acid can be used in step (b).

With respect to step (c), the temperature desired at which the oxidation will be carried out is established for the NaCl brine prior to addition of the oxidizing agent to the brine. This addition is accompanied by mixing. The amount of addition is monitored by a ORP (oxidation-reduction potential) meter to obtain the oxidation-reduction (redox) potential for forming the iodine-chlorine anionic complex under the condition of the pH of the NaCl brine already established. The combination of pH and redox potential is effective to oxidize the iodide to form the stable anionic iodine-chlorine complex. Thermodynamically, at the pH and ORP conditions established in steps (b) and (c), the identity of the iodine-chlorine complex is $(ICl_2)^-$ The preferred oxidizing agent used in step (c) is sodium hypochlorite.

With respect to step (d), the contacting of the NaCl brine with nonionic adsorption resin one with the other is preferably carried out after addition of the desired amount of oxidizing agent and the ORP of the brine has stabilized at the desired potential, but before the anionic iodine-chlorine complex can start to decompose.

The non-ionic adsorption resin can be used in either gel or in bead (granular) form to carry out the adsorption function. The beads can be small in the gel resin type or larger in the engineered resins designed for high flow rate applications. The preferred resin is styrene/divinylbenzene polymer and is available from multiple suppliers in different bead diameters and pore size. Another resin that can be used as the adsorbent is polyacrylic resin.

The preferred embodiment for a flow through system such as would be employed at commercial scale is a granular form to facilitate the operation of the bed of adsorption resin. A range of commercially available adsorption resins is available. The preferred selection will be based on engineering requirements. Smaller beads and higher pore volumes are generally more expensive and will have a higher pressure drop in the fixed bed. For high iodine-feed concentration solutions, such as 10 ppmw iodine, smaller beads will be preferred to provide higher capacity for the same size bed. For lower iodine-feed concentration solutions, larger beads can be used, balancing the improved pressure drop with lower capacity from the lower pore volumes.

Because the density of non-ionic (non-functionalized) adsorption resins is very low relative to strong base anion exchange resins and brine solutions, the non-functionalized resins can be employed in an upflow bed instead of the more common downflow beds used in brine purification.

With the low density of the non-functionalized resin, the beads will float even in a static system with low concentrations of NaCl present such as 4% NaCl. This feature extends the range of usefulness beyond applications for purification of salt solutions produced from dissolving dry NaCl for direct use in industrial applications such as chlor-alkali production. When dry NaCl is dissolved for a feedstock, a consistent high concentration NaCl solution is typically produced, such as 24% NaCl, with a high uptime to fix the designs of production. Such design parameters are found in the more common brine softening applications. However, NaCl solutions can also be present as a side product from other industrial processes. Since these NaCl solutions are not the primary products, the NaCl solution is typically not close to saturation and can often be highly variable. Using an upflow, floating system allows additional flexibility in a process purifying a solution which operates at variable NaCl concentrations and might have low uptime which would require times for the bed to remain static with no brine flow. Designing a system using a strong base anion exchange resin with variable density or low uptime would be more complicated and difficult to operate.

The nonionic nature of the resin arises from the resin (polymer) being free of functional groups, i.e. being non-functionalized. The resin is also preferably free of organic groups, which can be non-ionic, that are not part of the monomers forming the polymer that is the non-ionic adsorption resin used in step (d), but instead are added later such as by reaction with the polymer or adsorption into the pores of the adsorption resin.

Thus, the non-ionic adsorption resin used in the present invention is preferably that which consists of the polymer backbone. The non-ionic adsorption resin is also hydrophobic.

To entrap the iodine-chlorine anionic complex in the pores of the non-ionic adsorption resin, the beads of the resin can be mixed with the NaCl brine after formation of the anionic complex or the beads of the resin can be formed into a fixed bed through which the brine containing the anionic complex passes. The process of the present invention can be conducted batchwise or as a continuous process.

When the adsorptive capacity of the non-ionic adsorption resin is reached, the non-ionic adsorption resin and the remaining NaCl brine are separated from one another, such as by passing the brine containing the resin though a screen thorough which the brine passes, but not the beads of the resin. In the flow system, the iodine-containing brine is passed through the resin bed at a fixed flow rate until the adsorptive capacity of the non-ionic adsorption resin is reached. The resultant NaCl brine then preferably contains no more than 100 ppbw of iodine, more preferably no more than 10 ppbw. The ppmw and ppbw of iodine and other ingredients disclosed herein in the NaCl brine are on a weight basis (ppbw). When the goal product quality can no longer be achieved, the resin is regenerated.

The resin can then be regenerated by washing with a conventional elution liquid that removes the adsorbed iodine-chlorine complex from the pores of the resin. The resin is then useable again in the practice of the process of the present invention.

EXAMPLES

The oxidation-reduction potentials disclosed with respect to the present invention are referenced to an Ag/AgCl electrode.

In the Examples, the adsorptive capacity of non-ionic (non-functionalized) adsorption resin will be compared with that of anionic adsorption resin.

Example 1

Non-Functionalized Adsorbent Resin

A large aliquot of fresh Dow XAD1600N resin, which is a non-functionalized adsorbent resin, was placed in a solution of 20% NaCl solution to equilibrate overnight. XAD 1600N is characterized in its product sheet as (a) a macromolecular cross-linked aromatic polymer with no added functional groups, (b) being useful in a fixed bed, (c) having a harmonic mean bead size of 400±50 μm, a uniformity coefficient of 1.25, a surface area of >700 m²/g, a porosity of 1.4 cc/g, and a bulk density of 660 g/L and specific gravity of 1.015-1.025. Overnight, the resin volume shrank slightly as it equilibrated with the NaCl solution. After equilibration, the resin was filtered from the NaCl solution and placed moist into Erlenmeyer flasks (4) to prepare for isotherm testing. The weight of the resin added to each flask is reported in the first column of Table 1.

A solution of 20% NaCl was prepared from crystallized dry NaCl and lab grade deionized water and had a pH of 8. This NaCl solution was not purified to remove Ca or Mg which were present in the dry NaCl. The NaCl solution was adjusted to a pH of 1 by addition of aqueous 20% HCl solution. And then 21.9 ppmw iodide was added as potassium iodide. The ORP of the NaCl/iodide solution was adjusted with dilute NaOCl solution to a stable value of 900 mV. The resultant solution was then immediately portioned into 500 mL aliquots, and an aliquot was added to each of the four Erlenmeyer flasks containing the moist resin.

The solutions were each mixed with the moist resins for 24 hours. After cessation of mixing, the resin floated to the top of the solution and was filtered, and the remaining iodine concentration in the solution was measured. From the results given in Table 1, an equilibrium capacity of 35 g I/L resin was calculated for a 1 ppm I solution.

TABLE 1

Summary of Isotherm Experimental Results Using Non-Functionalized Resin as the Adsorbent (Dow XAD1600N)

| Resin weight (g) | Starting Measured I concentration (ppm) | End Measured I concentration (ppm) | Calculated capacity (g I/L resin) |
|---|---|---|---|
| 0.1224 | 21.9 | 6.26 | 48.15 |
| 0.2639 | 21.9 | 0.412 | 30.68 |
| 0.5056 | 21.9 | 0.185 | 16.18 |
| 1.0073 | 21.9 | 0.131 | 8.14 |

Comparison Example 1

Lanxess Lewatit S6368A, Strong Base Anion Exchange Resin

The S6368A resin is characterized in its product sheet as a strong base anion exchange resin with a quaternary amine group. The resin used in this Comparison Example is shipped in the chloride form (type 1). It is further characterized as being engineered for use in flowing beds, with the resin being in bead form having a mean bead size of 0.62±0.05 mm, a uniformity index of 1.1, a bulk density of 640 g/L and a density of 1.06 g/mL.

The procedure of Example 1 was then repeated for this Comparison Example, with the exception that 6.03 ppmw of iodide was added to the acidified NaCl solution. The proximity of the density of the resin beads and the density of the acidified NaCl solution resulted in some of the beads suspending in the solution. The amount of the beads added to each flask is reported in the first column of Table 2, which shows the results of this Comparison Example.

From the results given in the table, an equilibrium capacity of 5.3 g I/L resin was calculated for a 1 ppm I solution.

TABLE 2

Summary of Isotherm Experimental Results Using Anion Exchange Resin as the Adsorbent

| Resin weight (g) | Starting Measured I concentration (ppm) | End Measured I concentration (ppm) | Calculated capacity (g I/L resin) |
|---|---|---|---|
| 0.2786 | 6.03 | 1.09 | 6.45 |
| 0.5629 | 6.03 | 0.667 | 3.47 |
| 1.2551 | 6.03 | 0.449 | 1.62 |
| 2.6873 | 6.03 | 0.389 | 0.76 |

Comparison of the results reported in Table 1 vs. those reported in Table 2 shows a significant improvement in the adsorptive capacity of the non-functionalized resin vs. the anion exchange resin. For example, the resin weight of 0.2639 g of non-functionalized resin in Table 1 is shown to reduce the I concentration in the NaCl solution from 21.9 ppm to 0.412 ppm, which corresponds to an adsorptive capacity of 30.68 g I/L for the resin. In contrast, the resin weight of 0.2786 g reported in Table 2 is shown to reduce the I concentration from 6.03 ppm to 1.09 ppm, corresponding to an adsorptive capacity of the anionic exchange resin of only 6.45 g I/L. The adsorptive capacity of the non-functionalized resin is almost 5×that of the anion exchange resin. Similar superiority is revealed by comparing the results for 1.0073 g of non-functionalized resin (Table 1) with 1.2551 g of anion exchange resin (Table 2), resulting in adsorptive capacities of 8.14 g I/L vs 1.62 g I/L, respectively.

The calculated capacity in each table is determined by subtracting the end measured I concentration from the starting measured concentration, which is the amount of iodine removed in each experiment. These amounts are converted from g/500 mL to g/L. Next, the weight of resin in the first column of the Table, based on the density of the resin, is converted to volume of resin. The adsorptive capacity of the resin is the ratio of the g/L of I removed per the volume of the resin doing the removal.

The comparison of adsorptive capacities can be made more precise by standard methodology for comparing resin adsorptive capacity, which involves plotting (xy plot) the calculated adsorptive capacity of the resin against the end measured ppm of I in the acidified NaCl solution. The four adsorptive capacity determinations reported in each of Tables 1 and 2 provide a curve, from which the adsorptive capacity for each resin can be read at the same I concentration for each curve, e.g. a concentration of 1 ppm I in solution. For example, in Table 1, the adsorptive capacity equation is given as $y=9.639\ln(x)-34.112$, wherein x is the I amount in the solution and y is the adsorptive capacity of the resin, giving an adsorptive capacity of 35 g/L for the non-functionalized resin reported in Table 1.

Comparison Example 2

Importance of pH

The procedure of Example 1 was repeated using the same non-functionalized resin, except that the pH was adjusted to 2 and 28.9 ppmw of iodine as potassium iodide was added. The results are reported in Table 3.

TABLE 3

Summary of Isotherm Experimental Results Using Non-Functionalized Resin as the Adsorbent at pH (NaCl solution) of 2.

| Resin weight (g) | Starting Measured I concentration (ppm) | End Measured I concentration (ppm) | Calculated capacity (g I/L resin) |
| --- | --- | --- | --- |
| 0.1218 | 28.9 | 23.0 | 18.33 |
| 0.2504 | 28.9 | 22.3 | 9.97 |
| 0.5134 | 28.9 | 22.5 | 4.72 |
| 1.043 | 28.9 | 22.4 | 2.36 |

As is apparent by comparing the end measured I concentration in the acidified NaCl solution with the starting measured I concentration, very little I was adsorbed by the resin at the solution pH of 2.

Example 2

Flow System

A bed of the XAD1800N non-functionalized adsorbent resin of Example 1 was prepared in a small laboratory column following standard procedures. Due to its specific gravity of 1.015-1.025, the resin sinks when loaded into the column in water and then floats as NaCl solution is introduced into the bed. The column was prepared to run upflow.

After preparation and settling of the bed was completed, a solution prepared from dry NaCl and deionized lab water was prepared at a concentration of 20% NaCl. No additional purification to remove Ca and Mg or other impurities was conducted. The solution was adjusted to a pH of 1 with 20% HCl solution. Then 800 ppb I was added as potassium iodide to the NaCl solution. The ORP was then adjusted to 880 mV by NaOCl addition. This solution was fed upflow at 5 bed volumes/hr producing outlet quality brine averaging 10 ppb I.

What is claimed is:

1. Process for separating iodine from a NaCl brine, comprising the following sequential steps:
    (a) providing NaCl brine containing at least 4 wt % NaCl and containing iodide,
    (b) adjusting the pH of said NaCl brine from step (a) to be no greater than 1.5,
    (c) adding oxidizing agent to said NaCl brine from step (b) to obtain an oxidation-reduction potential in said NaCl brine of from 560 mV to 925 mV, the combination of said pH of no greater than 1.5 and oxidation-reduction potential of 560 mV to 925 mV resulting in the formation of an iodine-chlorine anionic complex, and
    (d) contacting a non-functionalized, nonionic adsorption resin and said NaCl brine from step (c) one with the other to adsorb said iodine from said brine from step (c).

2. The process of claim 1 wherein the NaCl brine of step (a) contains 17 to 25 wt % of said NaCl.

3. The process of claim 1 wherein said adjusting of step (a) is carried out by adding HCl to said NaCl brine.

4. The process of claim 1 wherein said oxidizing agent is alkali or alkaline earth metal hypochlorite.

5. The process of claim 4 wherein said oxidizing agent is sodium hypochlorite.

6. The process of claim 1 wherein said oxidizing is carried out at a temperature of from 15 to 50° C.

7. The process of claim 1 and additionally eluting said iodine from said nonionic adsorption resin.

8. The process of claim 1 wherein the result of step (d) is that NaCl brine thereof has an iodine content therein no greater than 100 ppbw.

9. The process of claim 8 wherein the iodine content of said brine is no greater than 10 ppbw.

10. The process of claim 1 wherein said pH is no greater than 1.4.

11. The process of claim 1 wherein said pH is no greater than 1.3.

12. The process of claim 1 wherein said pH is no greater than 1.2.

13. The process of claim 1 wherein said pH is no greater than 1.1.

14. The process of claim 1 wherein said pH is no greater than 1.0.

* * * * *